No. 891,169. PATENTED JUNE 16, 1908.
B. HILGER.
SPRING TIRE.
APPLICATION FILED JUNE 19, 1907.
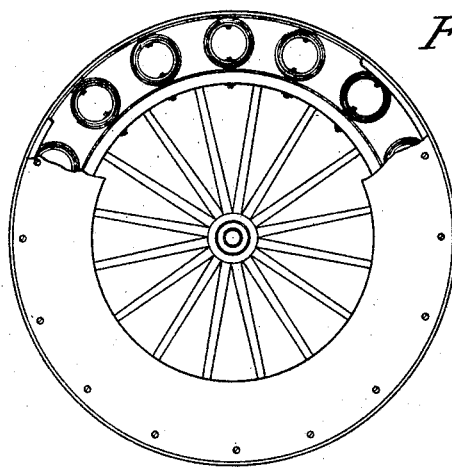
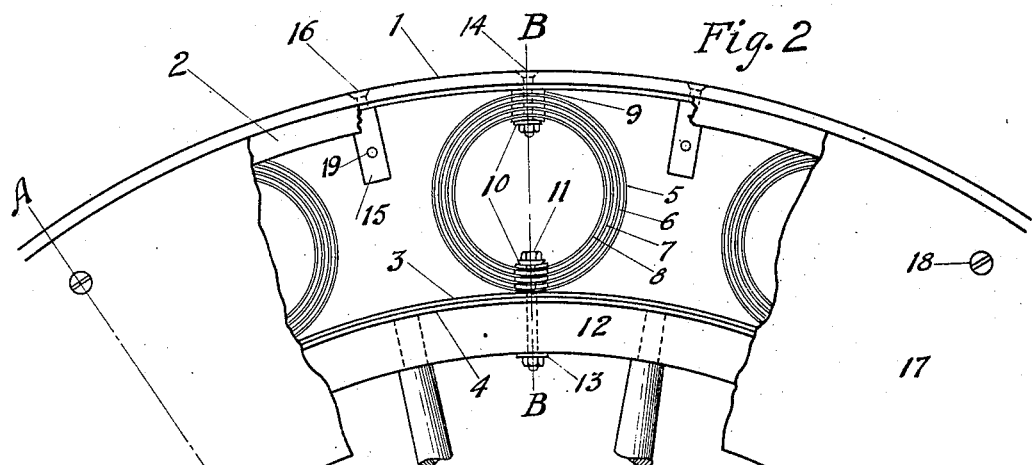
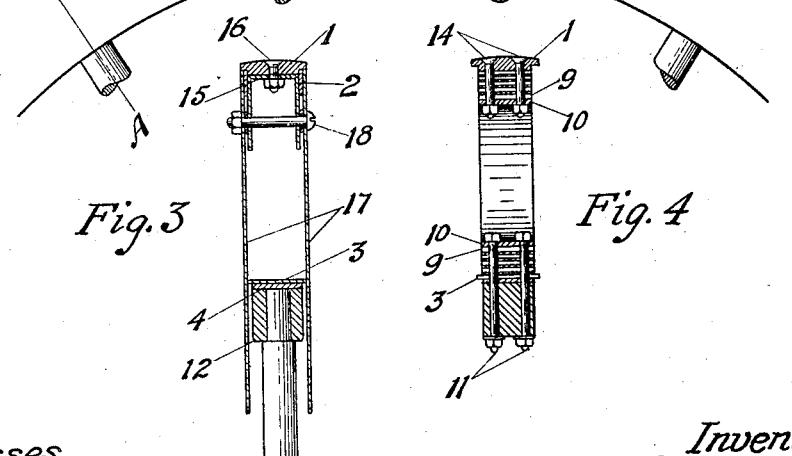
Witnesses.
Albert H Bates
H C Waddle
Inventor.
Bernhard Hilger
per Frank J C Krahn
Attorney

UNITED STATES PATENT OFFICE.

BERNHARD HILGER, OF ELGIN, ILLINOIS, ASSIGNOR TO FRANK J. C. KRAHN AND MORRITZ BAUTSCH, BOTH OF ELGIN, ILLINOIS.

SPRING-TIRE.

No. 891,169.　　　Specification of Letters Patent.　　　Patented June 16, 1908.

Application filed June 19, 1907. Serial No. 379,787.

*To all whom it may concern:*

Be it known that I, BERNHARD HILGER, a citizen of the United States, and a resident of the city of Elgin, county of Kane, and State of Illinois, have invented a certain new and useful Spring-Tire, of which the following is a specification.

My spring tire practically takes the place of the pneumatic rubber tire, because the same resiliency is had, but without any danger of puncturing, or blowing up, there are no valves to get out of order and the tire does not have to be inflated. There is no side-flection on springs, or tire and with a cover-plate the springs and working parts are kept free from dust, water and rust. When once adjusted to a wheel for a certain purpose and is of proper weight and strength, nothing but ordinary care is required to keep said tires and springs in perfect order for an indefinite time. If perchance through accident or some defect, a spring should become broken, the defective part can readily be replaced by duplicate and perfect part or parts.

In the accompanying drawings: Figure 1, represents assembled view of wheel, with springs attached to tire with a section of cover-plate removed. Fig. 2, represents a view of a section of a wheel showing the springs and general arrangement and method of attachment. Fig. 3, represents a sectional view of tire on line A—A in Fig. 2, which shows the position and arrangement of cover-plate, packing, and clips. Fig. 4, represents a sectional view, taken on line B—B in Fig. 2 and shows springs and alternating soft packing their position and their method of being bolted.

1, is a steel tire or outer rim.

2, is soft packing or washer, between outer rim (1) and cover-plate (17), which is to keep out dust and water.

3, a soft packing, or washer, extending slightly beyond felly of wheel, against which cover-plate (17) rests or plays and, which also is to keep out water and dust, as shown in Fig. 3.

4, a steel tire on outer edge of felly, around which packing (3) is fastened.

5, 6, 7 and 8 are four leaf springs, with soft packing or washers between each spring as shown at 9. A less number of springs and packing may be used if found more desirable, owing to lightness of the vehicle or conveyance to which the wheel is to be attached and according to the use the same is to be put to the width and weight of said springs being governed accordingly. Also more springs and packing may be added in like manner when a heavier weight of conveyance or vehicle requires it. Springs and packings are applied alternately as indicated.

9, indicates leather washer, or soft packing between outer rim (1) and spring (5), likewise between springs 5 and 6, 6 and 7, 7 and 8, also between washer (10) and spring (8). The same method is employed in fastening the set of springs to the outside rim (1), as to inside rim, or tire (4). Size and number of springs vary according to pressure and weight same will be subjected to.

10, is a steel washer with round or beveled corners, which is placed on top of spring 8, bolts (11) being run through said steel washer (10), through the springs and packings, through soft packing between spring (5) and steel rim (4), through felly (12), through steel washer (13), with nut or bur on end. All springs being lapped over at bottom through which bolt (11) passes.

13, is a metal washer as before described, resting on inside of felly (12) on bolt (11).

The outer portion of springs are held in place by countersunk head bolts (14) which pass through steel tire (1) through the springs and washers, then through steel washer (10) with nut on end.

15, is steel clip bolted on inside of outer rim (1) with countersunk head bolts (16) to which cover-plate (17) is bolted.

17, is steel cover-plate on each side of springs, firmly resting in recesses in rim (1) and against packing (2) and against edge of packing (3) and extending in this manner around entire wheel and extending inwardly toward hub of wheel far enough to insure protection to rims and springs while in action. Said cover-plate (17) is held in place by round-headed bolts (18), which pass through holes (19) in clips (15).

I claim:

In a wheel, a felly, an outer rim, springs interposed between said felly and rim, a plurality of clips carried by the rim and formed with a portion extending transversely of said rim and with down-turned end-portions, cover-plates secured to said down-turned end-portions of the clips, a packing, comprising a strip of soft material, interposed between said cover-plates and said rim, and a packing, comprising a strip of soft material, interposed between said springs and said felly and covering the entire periphery of said felly and extending beyond the sides thereof and against said cover-plates.

In testimony whereof I have hereto signed my name in the presence of two subscribing witnesses.

BERNHARD HILGER.

Witnesses:
GEORGE R. THOMPSON,
COLVIN W. BROWN.